Jan. 1, 1963 G. L. RICHARDS 3,071,695

MAGNETIC CORE PULSE OPERATED COUNTER

Filed Nov. 4, 1959 2 Sheets-Sheet 1

INVENTOR.
GLENN L. RICHARDS
BY
F. H. Henson
ATTORNEY

United States Patent Office 3,071,695

Patented Jan. 1, 1963

3,071,695

MAGNETIC CORE PULSE OPERATED COUNTER

Glenn L. Richards, Webster, N.Y., assignor to General Dynamics Corporation, Rochester, N.Y., a corporation of Delaware Filed Nov. 4, 1959, Ser. No. 850,808
4 Claims. (Cl. 307—88)

The present invention relates in general to pulse operated counters and, more particularly, to pulse operated counters of the type which utilize magnetic cores as principal elements thereof.

Square hysteresis loop magnetic cores used as quantized flux counters or integrating devices in frequency dividers and pulse counters are known in the prior art. In the counters of the prior art, the pulses to be counted are first standardized as to volt-second integral and the standardized pulses are applied to the input winding of the quantized flux counter. Prior to this invention, the coupling circuits utilized to couple the standardized pulses from the standardizer circuit to the counter or from one counter stage to another are extremely complex in design and critical in operation.

Accordingly, it is the general object of this invention to provide a new and improved pulse operated counter.

It is a more particular object of this invention to provide a new and improved plural stage pulse operated counter in which the coupling between stages is simple in design and reliable in operation.

Briefly, the present invention accomplishes the above cited objects by providing a pulse operated counter in which each stage comprises a counting core, a transistor, and a buffer core for coupling that stage to the counting core in the next succeeding stage. The counting core and the buffer core in each stage each comprises first and second windings, the first winding on the buffer core in each stage is directly coupled to the first winding on the counting core in the next succeeding stage, and the second windings on the counting and buffer cores in each stage are connected in the collector circuit of the transistor in that stage. Standardized pulses to be counted are applied to the first winding on the counting core in the first stage and the number of turns on the winding is so related to the volt-second integral of each standardized pulse that a predetermined number of standardized pulses is required to completely switch the counting core from one direction to the other direction of saturation. When the counting core in each stage is completely switched from one direction to the other direction of saturation, the transistor in that stage is triggered conductive. The collector and base of the transistor in each stage are regeneratively coupled through the first and second windings on the counting core in that stage, and the second windings on the counting and buffer cores are so poled that the counting core is reset to its one direction of saturation and the direction of saturation of the buffer core is reversed to thereby produce an output pulse in the first winding on the buffer core when the transistor in that stage becomes conductive. The number of turns on the first winding on the buffer core in each stage and the number of turns on the first winding on the counting core in the next succeeding stage are also so related that a particular number of output pulses is required to completely switch the counting core in the next succeeding stage from one direction to the other direction of saturation. When the transistor in each stage becomes nonconductive after switching the direction of saturation of the counting and buffer cores in that stage, the direction of saturation of the buffer core in that stage is restored to its original direction of saturation.

The buffer cores provided by the present invention provide the isolation between stages necessary to prevent a backflow of energy, prevent input pulses from being transferred to succeeding stages, and provide a means of insuring a fixed volt-second integral pulse for driving the next succeeding stage. The buffer cores are unaffected by variations in the magnitude or duration of the input pulses, variations in output loading, or variations in the bias source potential. Further, the buffer cores provide a means for presetting a stage, as in parallel read-in of information, without danger of backflow of energy to preceding stages.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise three figures on two sheets.

Figures 1, 2:
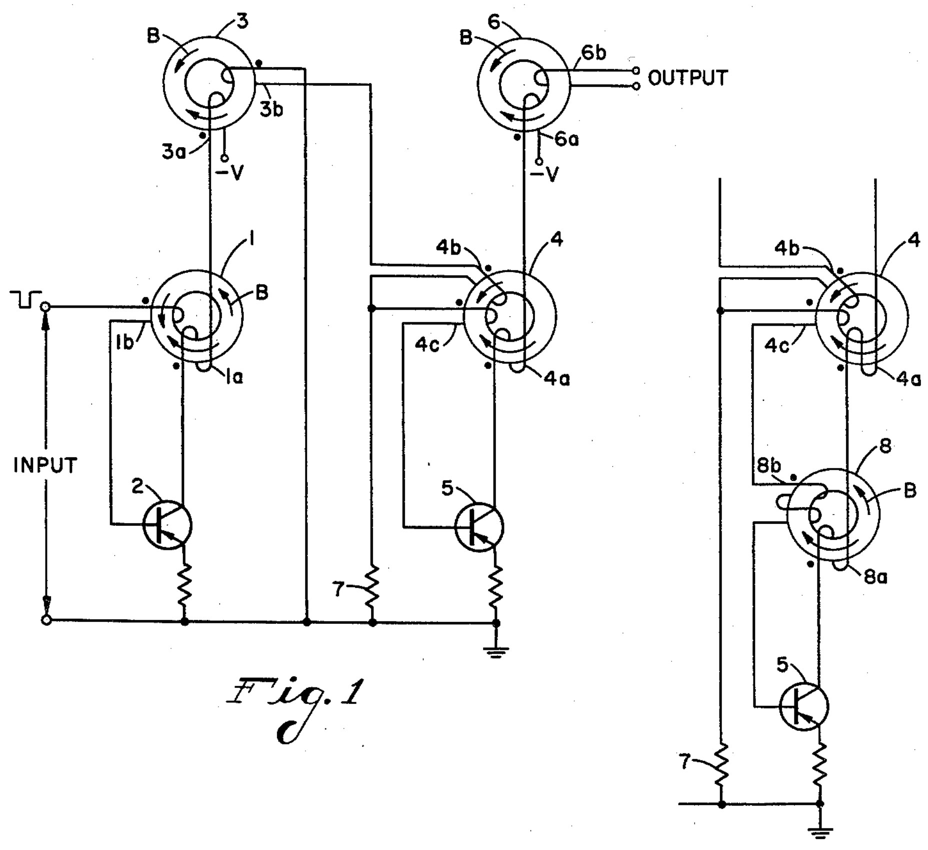
FIG. 1 shows a pulse standardizer circuit and a single stage pulse operated counter.
FIG. 2 shows an alternative mode of operation of the pulse operated counter of FIG. 1.
Figure 3:
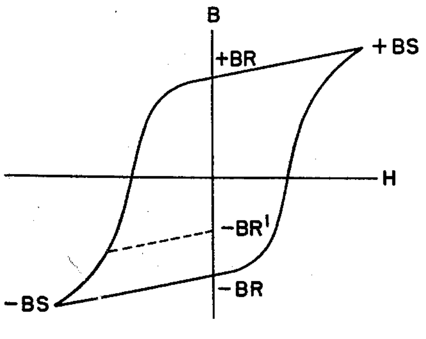
FIG. 3 shows the hysteresis loop for material suitable for use in the magnetic cores illustrated in the circuits of FIGS. 1 and 3.

Referring to FIG. 1, it can be seen that the pulse standardizer circuit comprises input core 1, PNP junction transistor 2, and buffer core 3, while the single stage pulse operated counter comprises counting core 4, PNP junction transistor 5, and buffer core 6. In the normal condition of the circuit, cores 1, 3, and 6 are held at negative saturation, identified as point —BS on the curve of FIG. 3, by a D.-C. bias applied in any well known manner and indicated by a counterclockwise arrow, labeled B, on the core cymbol, while counting core 4 stands at positive point of remanence, identified as point +BR on the curve of FIG. 3, due to the previous operation of transistor 5, as will be described more fully hereinafter. Each negative-going input pulse applied to the input terminals of the standardizer circuit is in a direction to saturate core 1 in the negative direction and is applied through winding 1*b* to the base of transistor 2 to trigger that transistor into conduction. The collector and base of transistor 2 are regeneratively coupled through windings 1*a* and 1*b* and winding 1*a* is poled so as to drive core 1 toward positive saturation, identified as point +BS on the curve of FIG. 3, so that transistor 2 is held conductive until core 1 is saturated in the positive direction. Also when transistor 2 becomes conductive, core 3 is driven to positive saturation and a pulse is produced in output winding 3*b*. The pulse produced across winding 3*b* has, of course, a fixed volt-second integral since core 3 is switched from negative to positive saturation regardless of the amplitude or duration of the pulse applied to the input terminals. When core 1 is saturated in the positive direction, transistor 2 becomes non-conductive, as previously explained, and the D.-C. bias returns cores 1 and 3 to negative saturation.

In a tested embodiment of the invention, output winding 3*b* on core 3 had six turns while input winding 4*b* on counting core 4 had five turns so that each output pulse applied to input winding 4*b* serves to switch core 4 from point of remanence +BR more than halfway but less than completely to negative saturation. In other words, core 4 was used as a binary divider. It is to be understood, however, that by suitable choice of turns ratio, the counting core 4 can be utilized to count any predetermined number of pulses before being completely switched to negative saturation. The first pulse applied across input winding 4*b* and resistor 7 results in voltage drops across said components and the flux switched in core 4 results in a voltage being developed in winding 4c which is equal to or greater than the voltage drop across resistor 7 and is of opposite polarity so that transistor 5 remains non-conductive. In the illustrated binary divider, at the termination of the first pulse from buffer core 3, core 4 returns to a negative point of remanence, identified as −BR′ on the curve of FIG. 3, which is more than halfway but less than the complete distance between positive and negative saturation. The second pulse applied to winding 4b results in a pulse in winding 4c which counteracts the voltage drop across resistor 7 but the pulse reduces to zero in a very short time when core 4 reaches negative saturation. When the voltage induced in winding 4c reduces to zero, the negative voltage developed across loop resistor 7 triggers transistor 5 into conduction. At the termination of the pulse applied to winding 4b, the current in winding 4a starts core 4 out of negative saturation, the collector and base of transistor 5 are regeneratively coupled through windings 4a, 4b, and 4c, core 4 is switched to positive saturation, core 6 is switched from negative to positive saturation through collector winding 6a, and a standard volt-second integral pulse is produced in output winding 6b. Transistor 5 becomes non-conductive when core 4 is completely switched to positive saturation and core 6 is thereafter returned to negative saturation by the D.-C. bias applied thereto.

An alternative mode of operation of the counting core and transistor of FIG. 1 is shown in FIG. 2. Like elements in FIGS. 1 and 2 have been given the same numerical designation so as to aid in the understanding of the circuit operation. As explained in the description of FIG. 1, when the second pulse applied to winding 4b of counting core 4 switches core 4 into negative saturation, the base of transistor 5 goes negative and transistor 5 is triggered into conduction. In the circuit of FIG. 2, the collector and base of transistor 5 are immediately regeneratively coupled through windings 8a and 8b on core 8. At the termination of the pulse applied to winding 4b on core 4, the collector and base of transistor 5 are also regeneratively coupled through windings 4a, 4b, and 4c on core 4, as previously explained, and transistor 5 remains conductive until both cores 8 and 4 are completely switched to positive saturation.

Figure 4:
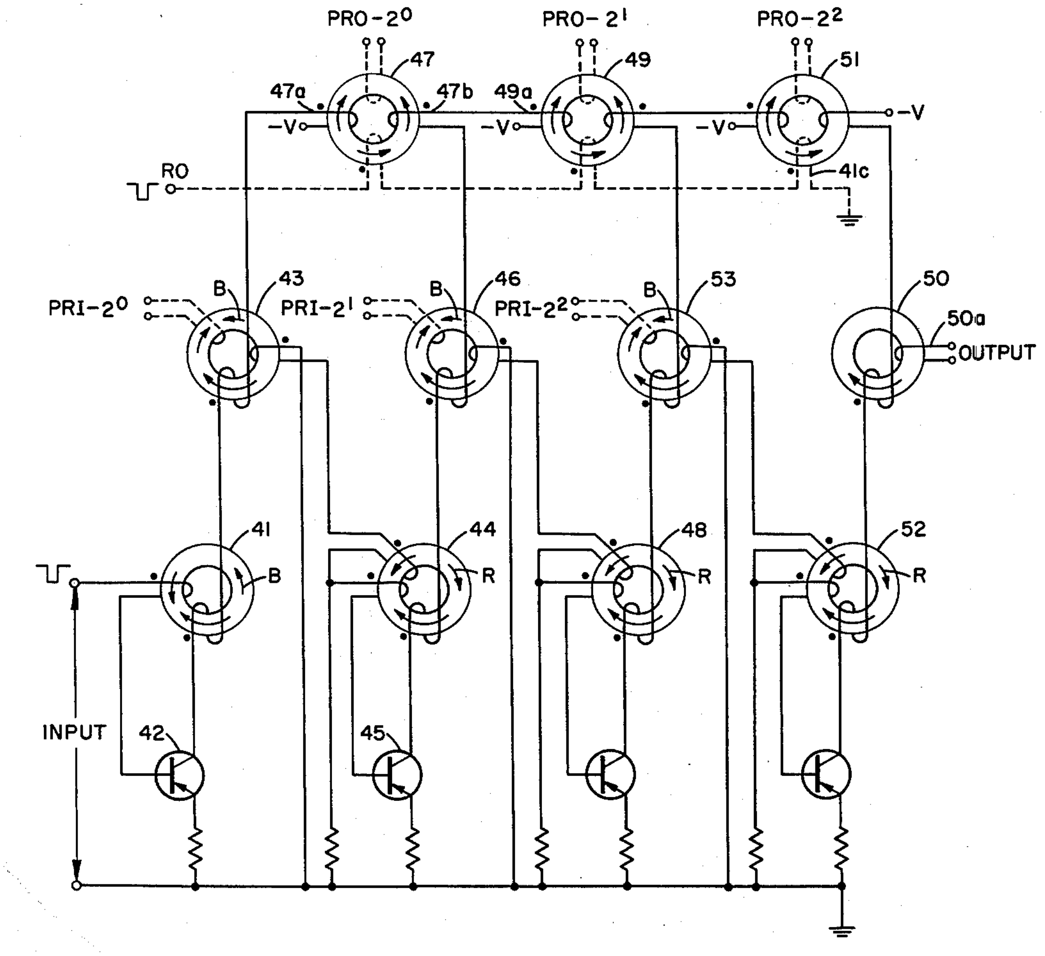
FIG. 4 shows a pulse standardizer circuit and a three-stage binary divider pulse operated counter.

A pulse operated counter comprising three binary stages is illustrated in FIG. 4. The counter comprises a pulse standardizer circuit comprising core 41, transistor 42, and buffer core 43 while each counter stage comprises a counting core, such as 44, a transistor, such as 45, a buffer core, such as 46, and a monitor core, such as 47. The monitor cores, which are always fully switched in one direction or the other, are provided in this embodiment of the invention for the purpose of allowing full volt-second output pulses to be coupled to a load when parallel read-out is required. When transistor 42 becomes conductive responsive to the receipt of the first input pulse, core 43 is switched in the exact same manner as previously described and monitor core 47 is switched to positive saturation through winding 47a to indicate that a "1" is stored in the first binary divider stage. When the second input pulse is received, core 46 is switched to apply an input pulse to core 48 in the second stage, core 47 is reset to negative saturation through winding 47b, and core 49 is set to positive saturation through winding 49a to thus indicate that a "1" is stored in the second binary divider stage. Thus, it can be seen that the monitor cores give an indication of the setting of the binary divider stages.

The illustrated three-stage binary divider counter may be used as a frequency divider. That is, upon receipt of each eighth input pulse, a fixed volt-second integral pulse appears across output winding 50a. The illustrated three-stage counter circuit may also be used as an up-to-eight counter circuit with parallel read-out. For example, if the counter has counted four input pulses, core 51 is at positive saturation indicating a "1" while cores 47 and 49 are at negative saturation indicating a "0." Under these conditions, when a negative-going pulse is applied to read-out terminal RO, core 51 is switched from positive to negative saturation and a fixed volt-second integral pulse appears across parallel read-out winding PRO-$2^2$. When parallel read-out is used, a reset pulse is applied to the counting cores 44, 48, and 52, in any well known manner, simultaneously with the application of a read-out pulse to terminal RO so as to bring all of the counting cores to positive saturation as indicated bf the clockwise arrow marked R on the counting core symbols.

As indicated by dotted windings on the buffer cores 43, 46, 53, and 50, parallel read-in may be used to preset a count in the counter circuit. For example, if it is desired to preset a count of two in the counter, a pulse is applied to parallel read-in winding PRI-$2^1$ to switch core 46 to positive saturation and thus switch counting core 48 to the point of remanence −BR′. Operation then proceeds in the exact same manner as previously described. In an application of this type, the monitor cores 47, 49, and 51 would not be provided.

While there has been shown and described what is at present considered to be the preferred embodiments of the invention, modifications thereto will readily occur to those skilled in the art. It is not desired, therefore, that the invention be limited to the embodiments shown and described, and it is intended to cover in the appended claims all such modifications as fall within the true spirit and scope of the invention.

What is claimed is:

1. A pulse operated counter comprising first and second magnetic cores having substantially rectangular hysteresis loops, a transistor having base, emitter, and collector electrodes, first and second windings on each of said cores, a source of potential, means for returning said emitter to one terminal of said source of potential, means for returning said collector to the other terminal of said source of potential through the second windings on said first and second cores, means for developing a standardized volt-second pulse from each pulse to be counted, means for applying said standardized pulses to the first winding on said first core, the number of turns on the first winding on said first core being so related to the volt-second integral of each standardized pulse that a particular number of said standardized pulses is required to completely switch said first core from saturation in one direction to saturation in the other direction, means responsive to the completion of switching of said first core to its other direction of saturation for applying a signal to said base to trigger said transistor conductive, means including the first and second windings on said first core for regeneratively coupling the collector and base of said transistor, the second windings on said first and second cores being so poled that said first core is reset to its one direction of saturation and the direction of saturation of said second core is reversed when said transistor becomes conductive, and means for restoring said second core to its original direction of saturation when said transistor is no longer conductive.

2. A pulse operated counter comprising first and second magnetic cores having substantially rectangular hysteresis loops, a transistor having a base, an emitter, and a collector, first and second windings on each of said cores, a source of potential, means for returning said emitter to one terminal of said source of potential, means for returning said collector to the other terminal of said source of potential through the second windings on said first and second cores, means for developing a standardized volt-second integral pulse from each pulse to be counted, means for applying said standardized pulses to the first winding on said first core, the number of turns on the first winding on said first core being so related to the volt-second integral of each standardized pulse that a single standardized pulse switches said first core more than halfway but less than completely from saturation in on direction to saturation in the other direction, means responsive to the completion of switching of said first core to its other direction of saturation for applying a signal to said base to trigger said transistor conductive, means including the first and second windings on said first core for regeneratively coupling the collector and base of said transistor, the second windings on said first and second cores being so poled that said first core is reset to its one direction of saturation and the direction of saturation of said second core is reversed when said transistor becomes conductive, and means for restoring said second core to its original direction of saturation when said transistor is no longer conductive.

3. A pulse operated counter comprising a plurality of stages, each of said stages comprising first and second magnetic cores having substantially rectangular hysteresis loops, and a transistor having a base, an emitter, and a collector, first and second windings on each of said cores, means for connecting the first winding on the second core in each stage to the first winding on the first core in the next succeeding stage, a source of potential, means for returning the emitter of the transistor in each stage to one terminal of said source of potential, means for returning the collector of the transistor in each stage to the other terminal of said source of potential through the second windings of the first and second cores in that stage, means for developing a standardized volt-second integral pulse from each pulse to be counted, means for applying said standardized pulses to the first winding on the first core in said first stage, the number of turns on the first winding on the first core in said first stage being so related to the volt-second integral of each standardized pulse that a particular number of said standardized pulses is required to completely switch said core from saturation in one direction to saturation in the other direction, means in each stage responsive to the completion of the switching of the first core in that stage to its other direction of saturation for applying a signal to the base of the transistor in that stage to trigger that transistor conductive, means including the first and second windings on the first core in each stage for regeneratively coupling the collector and base of the transistor in that stage, the second windings on the first and second cores in each stage being so poled that said first core is reset to its one direction of saturation and the direction of saturation of said second core is reversed to thereby produce an output pulse in the first winding on said second core when the transistor in that stage is conductive, the number of turns on the first winding on the second core in each stage and the number of turns on the first winding on the first core in the next succeeding stage being so related that a particular number of said output pulses is required to completely switch the first core in the next succeeding stage from saturation in one direction to saturation in the other direction, and means in each stage for restoring the second core in that stage to its original direction of saturation when the transistor in that stage is no longer conductive.

4. A pulse operated counter comprising a plurality of stages, each of said stages comprising first and second magnetic cores having substantially rectangular hysteresis loops, and a transistor having a base, an emitter, and a collector, first and second windings on each of said cores, means for connecting the first winding on the second core in each stage to the first winding on the first core in the next succeeding stage, a source of potential, means for returning the emitter of the transistor in each stage to one terminal of said source of potential, means for returning the collector of the transistor in each stage to the other terminal of said source of potential through the second windings of the first and second cores in that stage, means for developing a standardized volt-second integral pulse from each pulse to be counted, means for applying said standardized pulses to the first winding on the first core in said first stage, the number of turns on the first winding on the first core in said first stage being so related to the volt-second integral of each standardized pulse that a single standardized pulse switches said first core more than halfway but less than completely from saturation in one direction to saturation in the other direction, means in each stage responsive to the completion of the switching of the first core in that stage to its other direction of saturation for applying a signal to the base of the transistor in that stage to trigger that transistor conductive, means including the first and second windings on the first core in each stage for regeneratively coupling the collector and base of the transistor in that stage, the second windings on the first and second cores in each stage being so poled that said first core is reset to its one direction of saturation and the direction of saturation of said second core is reversed to thereby produce an output pulse in the first winding on said second core when the transistor in that stage is conductive, the number of turns on the first winding on the second core in each stage and the number of turns on the first winding on the first core in the next succeeding stage being so related that a single output pulse switches the first core in the next succeeding stage more than halfway but less than completely from saturation in one direction to saturation in the other direction, and means in each stage for restoring the second core in that stage to its original direction of saturation when the transistor in that stage is no longer conductive.

References Cited in the file of this patent

UNITED STATES PATENTS

| | | |
|---|---|---|
| 2,925,958 | Polzin et al. | Feb. 23, 1960 |
| 3,003,067 | Myers | Oct. 3, 1961 |